(12) United States Patent
Schipper

(10) Patent No.: US 6,720,913 B1
(45) Date of Patent: Apr. 13, 2004

(54) LOCK SLIP DETECTION USING INERTIAL INFORMATION

(75) Inventor: Brian W. Schipper, Brooklyn Park, MN (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 10/290,992

(22) Filed: Nov. 8, 2002

(51) Int. Cl.[7] .............................. G01S 5/02; H04B 7/185
(52) U.S. Cl. .............................. 342/357.04; 342/357.11
(58) Field of Search ..................... 342/357.04, 357.11, 342/357.06, 357.03, 357.12; 701/213

(56) References Cited

U.S. PATENT DOCUMENTS

| | | | |
|---|---|---|---|
| 5,266,958 A | 11/1993 | Durboraw, III | ............. 342/357 |
| 5,890,091 A | 3/1999 | Talbot et al. | ................ 701/215 |
| 6,166,683 A | * 12/2000 | Hwang | ................... 342/357.04 |

OTHER PUBLICATIONS

Colombo, O.L., U.V. Bhapkar, A.E. Evans, Inertial–Aided Cycle–Slip Detection/Correction for Precise, Long–Baseline Kinematic GPS, Proc. ION GPS'99, Nashville, Tennessee, Sep. 1999.

Vik, B. and Thor I. Fossen, Nonlinear Analysis of GPS Aided by INS, Proceedings of the ION 55'th Annual Meeting, Cambridge MA, USA, pp. 683–688 (1999).

* cited by examiner

Primary Examiner—Theodore M. Blum
(74) Attorney, Agent, or Firm—McDonnell Boehnen Hulbert & Berghoff LLP

(57) ABSTRACT

A method for detecting lock slip using inertial information is provided. The method involves an epoch comparison of a predicted delta phase range with a measured delta phase range. The predicted delta phase range is calculated by subtracting a previous inertial solution from a current inertial solution. The measured delta phase range is calculated by subtracting a previous carrier phase measurement from a current carrier phase measurement. If a difference between the predicted delta phase range and the measured delta phase range is greater than a threshold amount, a lock slip is declared. The method allows for lock slip detection in Global Positioning System (GPS) attitude determinations without relying on a lock slip notification from the GPS.

21 Claims, 2 Drawing Sheets

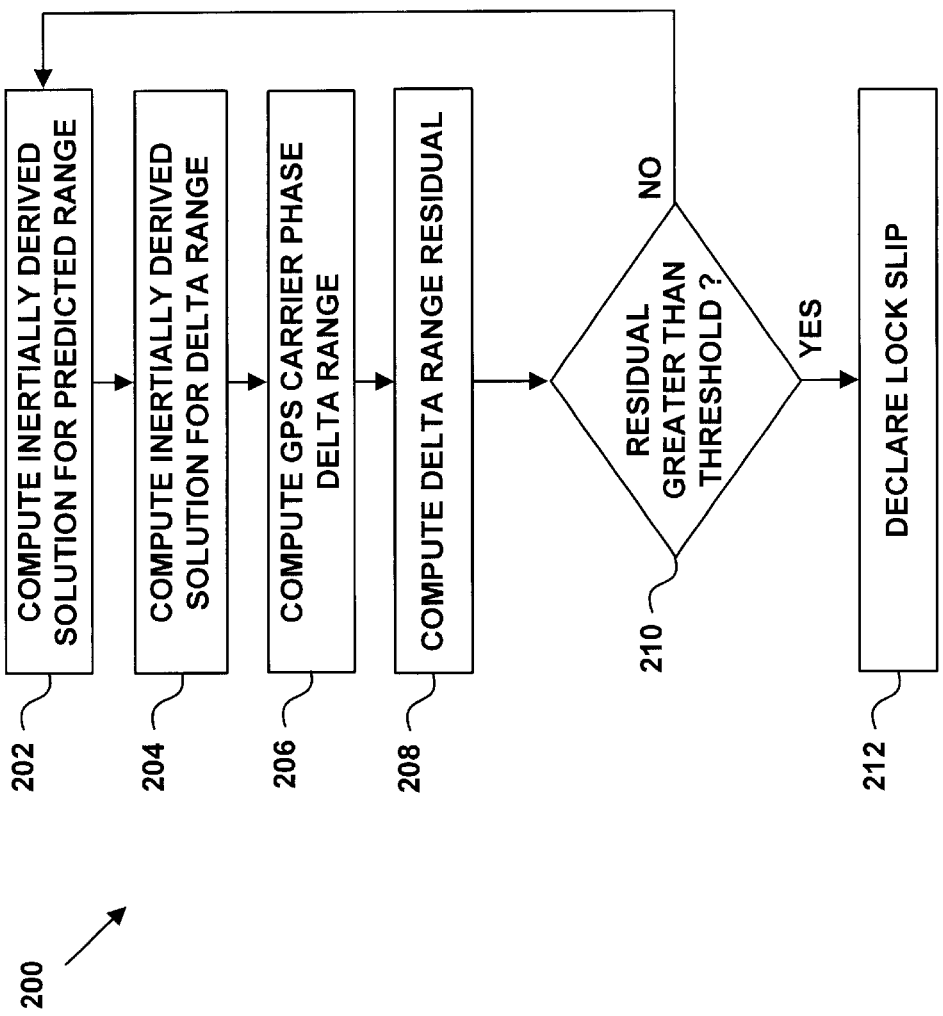

LOCK SLIP DETECTION USING INERTIAL INFORMATION

FIELD

The present invention relates generally to carrier phase measurements, and more particularly, relates to lock s lip detection.

BACKGROUND

A Global Positioning System (GPS) is a satellite-based system that provides position, velocity, and time infonrmation with a high degree of accuracy. The GPS consists of a number of orbiting satellites and receivers. Currently there are twenty-four satellites revolving in six orbital planes. The orbiting satellites broadcast a continuous series of radio signals, which are detected by the receivers.

The radio signals contain information regarding the known position of the satellites, the distance to each satellite, and the relative velocity of the satellites with respect to the receiver. With information from four or more satellites, the receiver location can be determined. For more accurate position measurements, two or more receivers may be used together to provide differential correction. A system using two or more receivers is referred to as Differential GPS (DGPS).

A high-performance GPS receiver can provide carrier phase measurements. The carrier phase measurements are formed by a phase lock loop (PLL) and are derived from the comparison of the incoming satellite broadcast with a phase of an oscillator located within the receiver at an epoch of measurement. While the accumulated difference between the received transmissions and the receiver phase can be measured and monitored, it is not possible to measure the number of waves between the receiver and the satellite at an instance of first observation. This unknown quantity is called integer ambiguity and requires ambiguity resolution in order to use the carrier phase measurements as range measurements. Ambiguity resolution may be performed using a variety of methods including integer searches and motion-based approaches. Furthermore, ambiguity resolution may use as aids multiple antenna pairs, multiple GPS observables, and external aiding.

While ambiguity resolution can be thought of as enabling the use of carrier phase information as an absolute range measurement between a GPS receiver's antenna and a satellite, in a practical sense ambiguity resolution is typically used to determine relative range between two or more GPS antennas, and not to determine the absolute range between a receiver and a satellite. This document will continue to refer to the range determined via ambiguity resolution generically as a range.

Once ambiguity resolution has been accomplished, the GPS carrier phase measurements can be used as very accurate range measurements. The ambiguity resolution will remain valid for each satellite as long as the GPS receiver maintains a lock on the GPS carrier signal from the satellite. However, if there is a loss of carrier phase lock or "lock slip," ambiguity resolution must be executed again. Lock slip may be caused by obstructions to the satellite signal, low signal to noise ratio, incorrect processing within the receiver software, high antenna acceleration, interference from other radio signal sources, or high ionospheric activity.

The use of carrier phase measurements in commercial aviation is becoming ore applicable due to the adoption of microelectromechanical system (MEMS) inertial sensors in Inertial Navigation Systems (INS). While MEMS inertial systems can adequately provide pitch and roll solutions, they are incapable of providing a heading solution. Using GPS carrier phase measurements to compute an attitude solution, including but not limited to heading, may solve this shortcoming. Commonly referred to as GPS attitude determination, this approach utilizes the carrier phase measurements from a number of pairs of GPS receivers/antennas rigidly mounted on a vehicle body to compute an attitude solution based on the precise relative position of the GPS antenna pairs. The multiple antennas may all be connected to a single GPS receiver or there may be an individual GPS receiver for each antenna. This precise relative solution is possible due to the availability of carrier phase range measurements, which are enabled by ambiguity resolution.

It is important that the GPS attitude determination algorithm be aware of any lock slips. If a lock slip occurs and ambiguity resolution is not executed again, the GPS attitude solution may be incorrect. While most receivers provide a "lock slip indication" along with their carrier phase measurements, a more reliable method is needed.

For applications that integrate INS with GPS, the inertial information from the INS can provide a more reliable and self-contained method for lock slip detection.

BRIEF DESCRIPTION OF THE DRAWINGS

Presently preferred embodiments are described below in conjunction with the appended drawing figures, wherein like reference numerals refer to like elements in the various figures, and wherein:

FIG. 2 is a flow chart diagram of a lock slip detection method, according to an exemplary embodiment.

DETAILED DESCRIPTION

Figure 1:
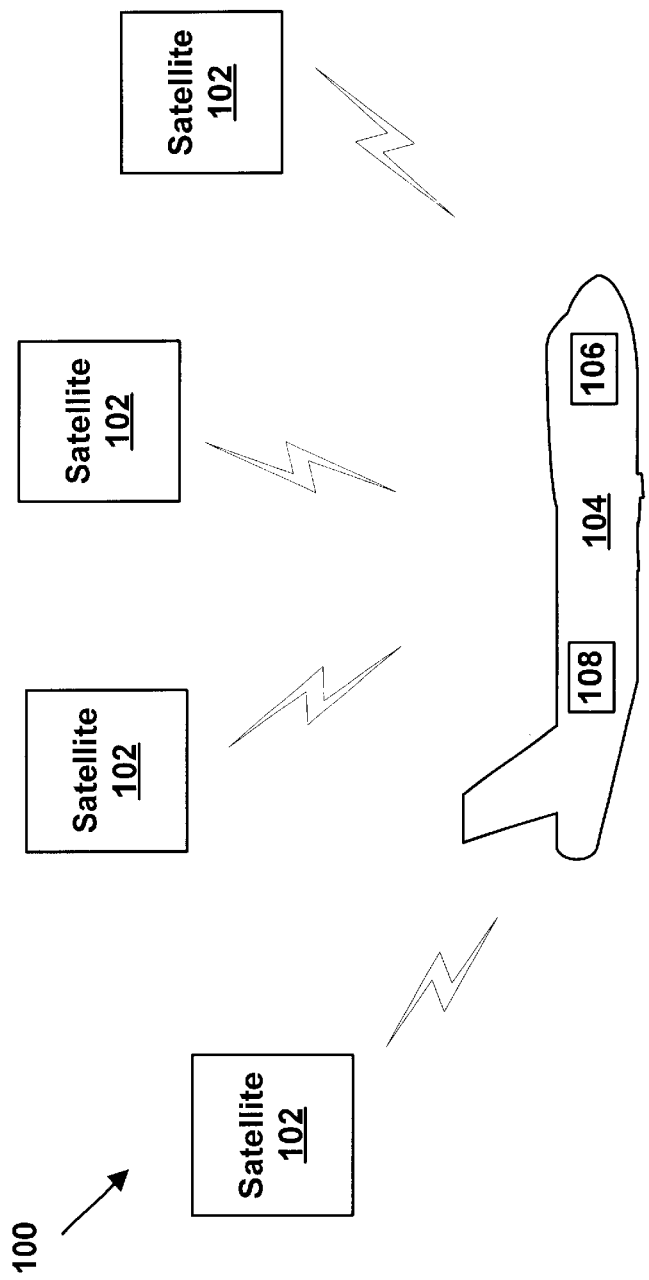
FIG. 1 is a pictorial representation of an integrated Global Positioning System/Inertial Navigation System, according to an exemplary embodiment.

FIG. 1 shows a pictorial representation of an integrated Global Positioning System/Inertial Navigation System (GPS/INS) system 100, according to an exemplary embodiment. The integrated GPS/INS system 100 includes a plurality of satellites 102 and a vehicle 104 that includes an INS 106 and at least one GPS receiver 108. FIG. 1 depicts the vehicle as an aircraft, but the vehicle 104 may be any vehicle requiring navigation information. For example, the vehicle 104 may be a car, truck, boat, or train.

The plurality of satellites 102 may include any of the twenty-four satellites currently orbiting the earth and any new satellites that are installed in the future. The plurality of satellites 102 may continuously broadcast signals containing ephemeris data that accurately describes the orbits of the satellites. The plurality of satellites 102 may transmit two or more L-band signals, which may be used for positioning purposes. These two or more signals, named L1 and L2 in the current GPS system, also referred to as the carriers, may be generated from a fundamental satellite clock frequency of 10.23 MHz. Currently L1 has a frequency of 1575.42 MHz, while L2 has a frequency of 1227.60 MHz.

The at least one GPS receiver 108 may have at least one antenna rigidly mounted to the exterior of the vehicle 104, while the INS 106 may be rigidly mounted within the vehicle 104. Other arrangements may be possible depending on the type of vehicle. FIG. 1 depicts the INS 106 and the at least one GPS receiver 108 as blocks for convenience of illustration.

The INS 106 may include one or more gyroscopes and one or more accelerometers. The gyroscopes measure angular motion, while the accelerometers measure change in velocity. The gyroscopes and the accelerometers may be microelectromechanical system (MEMS) inertial sensors. The INS 106 may be operable to provide position, velocity, and attitude information for the vehicle 104. For example, if the vehicle is an aircraft, the INS 106 may provide heading, pitch, and roll solutions.

The at least one GPS receiver 108 may detect signals from the plurality of satellites 102 using at least one antenna. The at least one antenna may be designed to be omni-directional with a gain of approximately 3 dB, which provides for signal detection above a horizontal plane of the antenna. The at least one GPS receiver 108 may make range measurements, such as carrier phase measurements, based on the broadcasted signals from the plurality of satellites 102. The carrier phase measurements may be formed by a phase lock loop (PLL) in the at least one GPS receiver 108 and are derived from a comparison of the incoming satellite broadcast with a phase of an oscillator located within the at least one GPS receiver 108 at an epoch of measurement.

The at least one GPS receiver 108 may perform ambiguity resolution when power is applied to the at least one GPS receiver 108. The ambiguity resolution may be performed using a variety of methods, including integer searches and motion-based approaches. Furthermore, the ambiguity resolution may use as aids multiple antenna pairs, multiple GPS observables, and external aiding. Once ambiguity resolution has been accomplished, the GPS carrier phase measurements may be used to provide the GPS attitude determination. The ambiguity resolution for each satellite will remain valid as long as the at least one GPS receiver 108 maintains a lock on the GPS carrier signal from that satellite, which is one of the plurality of satellites 102. However, if there is a lock slip, the ambiguity resolution must be executed again for each GPS satellite for which the phase lock loop slips to ensure a correct attitude solution.

FIG. 2 depicts a flow chart diagram of a lock slip detection method 200, according to an exemplary embodiment. The lock slip detection method 200 involves an epoch by epoch comparison of a predicted delta phase range with a measured delta phase range. The predicted delta phase range is computed from the integrated GPS/inertial solution. The measured delta phase range is computed from the carrier phase measurements at a given frequency (e.g., every 30 seconds) or epoch rate.

The lock slip detection method 200 may be performed using a combination of software, firmware, and hardware. In a preferred embodiment, a software algorithm stored in the INS 106 may perform the lock slip detection method 200. The INS 106 uses outputs from both the at least one GPS receiver 108 and the INS 106 to perform the lock slip detection method 200.

Step 202 is computing an inertially derived solution for predicted range between a GPS antenna and a GPS satellite, n, at time, k. The inertially derived solution for predicted range between the GPS antenna and the GPS satellite n, using the INS, can be expressed as follows.

$$\hat{x}_{n_k} = |S_{n_k} - P_k| \qquad \text{(Equation 1)}$$

In Equation 1, $S_{n_k}$ represents the earth centered earth fixed (ECEF) position of GPS satellite n at time k. The ECEF is a Cartesian coordinate frame of reference in which the origin of axis is located at the center of the earth. The at least one GPS receiver 108 typically provides the $S_{n_k}$. $P_k$ represents the position of the GPS antenna at time k based on the inertial solution. The computation of $P_k$ may involve a lever arm correction for compensating for the distance between the location of the GPS antenna and the INS. If the GPS antenna and the INS are co-located, the lever arm correction may not be needed.

Step 204 is computing an inertially derived solution for delta range for a satellite using a known previous inertial solution, $\hat{x}_{n_{k-1}}$, and a current inertial solution, $\hat{x}_{n_k}$. The inertially derived solution for delta range may be calculated by subtracting the previous inertial solution from the current inertial solution. The inertially derived solution for delta range represents the predicted delta phase range and can be expressed as follows.

$$\Delta \hat{x}_{n_k} = \hat{x}_{n_k} - \hat{x}_{n_{k-1}} \qquad \text{(Equation 2)}$$

Step 206 is computing a GPS carrier phase delta range. The GPS carrier phase delta range may be calculated by subtracting a previous carrier phase measurement from a current carrier phase measurement. The GPS carrier phase delta range represents the measured phase range. The GPS carrier phase delta range can be expressed as follows.

$$\Delta \phi_{n_k} = \phi_{n_k} - \phi_{n_{k-1}} \qquad \text{(Equation 3)}$$

In Equation 3, $\phi_{n_k}$ represents the carrier phase measurement from the GPS receiver for a satellite n at time k. Steps 204 and 206 may be performed concurrently.

Step 208 is computing a delta range residual. The delta range residual, $r_{n_k}$, may be computed by subtracting the inertially derived solution for delta range (Equation 2 result) from the carrier phase delta range (Equation 3 result). The delta range residual can be expressed as follows.

$$r_{n_k} = \Delta \phi_{n_k} - \Delta \hat{x}_{n_k} \qquad \text{(Equation 4)}$$

The delta range residual represents how close the change in GPS carrier phase measurements are to the predicted results using the inertial solution from the INS 106. Steps 204–208 may occur at each GPS measurement epoch and for each available satellite where carrier phase ranges are received from the at least one GPS receiver 108.

Step 210 is determining whether the delta range residual for a particular satellite is above a threshold amount. This threshold amount will typically be set to be a magnitude approximately half a wavelength of the GPS signal on which carrier phase ambiguity resolution is being executed. For example, in a single frequency L1 application, the wavelength is about 19 cm. Therefore, the threshold amount may be set to approximately 9.5 cm. However, the threshold amount can be set to any value as determined to be appropriate for the application. For example, the threshold amount may be set lower for very high integrity applications or higher for lower integrity applications. Inconsistencies in the delta range residual may indicate a lock slip.

Step 212 is declaring a lock slip. If the delta range residual for a particular satellite is above the threshold amount, a lock slip for that satellite may be declared. Once a lock slip has been detected, ambiguity resolution for that satellite may be performed again to ensure a correct ambiguity and attitude solution.

This method allows for lock slip detection in GPS attitude determinations without relying on the lock slip notification from the GPS. By using the inertial solution from the INS, the lock slip detection method 200 provides a more reliable nd self-contained method for lock slip detection.

It should be understood that the illustrated embodiments are exemplary only and should not be taken as limiting the scope of the present invention. The claims should not be read as limited to the described order or elements unless stated to that effect. Moreover, while the exemplary method was described using ordered steps, this does not necessarily reflect step-plus-function claiming, and other sequences may also be utilized. Therefore, all embodiments that come within the scope and spirit of the following claims and equivalents thereto are claimed as the invention.

I claim:

1. A method for detecting lock slip, comprising in combination:

comparing a predicted delta phase range with a measured delta phase range; and declaring a lock slip if a difference between the predicted delta phase range and the measured delta phase range is greater than a threshold amount.

2. The method of claim 1, wherein the predicted delta phase range is calculated by subtracting a previous inertial solution from a current inertial solution.

3. The method of claim 2, wherein the previous inertial solution and the current inertial solution are determined by an Inertial Navigation System (INS).

4. The method of claim 2, wherein the previous inertial solution and the current inertial solution are positions of a satellite at a particular time.

5. The method of claim 2, wherein the previous inertial solution and the current inertial solution are calculated by taking an absolute value of a difference between an earth centered earth fixed position of a satellite and a position of an antenna based on an inertial solution.

6. The method of claim 5, wherein a lever arm correction may be performed in determining the position of the antenna.

7. The method of claim 1, wherein the measured delta phase range is calculated at a given frequency.

8. The method of claim 1, wherein the measured delta phase range is calculated by subtracting a previous carrier phase measurement from a current carrier phase measurement.

9. The method of claim 8, wherein the previous carrier phase measurement and the current carrier phase measurement are determined by a receiver.

10. The method of claim 1, wherein the threshold amount is a magnitude approximately half of a wavelength of a signal on which ambiguity resolution is being performed.

11. The method of claim 1, wherein the steps of comparing the predicted delta phase range with the measured delta phase range and declaring the lock slip are performed by a software algorithm stored in an Inertial Navigation System (INS).

12. A method for detecting lock slip, comprising in combination:

computing an inertially derived solution for predicted range between an antenna and a satellite;

computing an inertially derived solution for delta range by subtracting a previous inertial solution from a current inertial solution;

computing a carrier phase delta range by subtracting a previous carrier phase measurement from a current carrier phase measurement;

computing a delta range residual by subtracting the inertially derived solution for delta range from the carrier phase delta range; and declaring a lock slip if the delta range residual is greater than a threshold amount.

13. The method of claim 12, wherein the inertially derived solution for predicted range is determined by an Inertial Navigation System (INS).

14. The method of claim 12, wherein the inertially derived solution for predicted range is calculated by taking an absolute value of a difference between an earth centered earth fixed position of the satellite and a position of the antenna based on an inertial solution.

15. The method of claim 14, wherein the inertial solution is a position of the antenna at a particular time.

16. The method of claim 12, wherein the previous carrier phase measurement and the current carrier phase measurement are determined by a receiver.

17. The method of claim 12, wherein the carrier phase delta range is calculated at a given frequency.

18. The method of claim 12, wherein the threshold amount is a magnitude approximately half of a wavelength of a signal on which ambiguity resolution is being performed.

19. A system for providing lock slip detection, comprising in combination:

a plurality of satellites providing position information;

a receiver operable to obtain the position information from the plurality of satellites, wherein the receiver produces carrier phase measurements based on the position information; and an inertial navigational system (INS) operable to calculate an inertial solution of position, wherein the INS detects a lock slip by comparing the carrier phase measurements to the inertial solution.

20. The system of claim 19, wherein the lock slip is detected when a comparison of the carrier phase measurements to the inertial solution is greater than a threshold amount.

21. The system of claim 20, wherein the threshold amount is a magnitude approximately half of a wavelength of a signal on which ambiguity resolution is being performed.

* * * * *

UNITED STATES PATENT AND TRADEMARK OFFICE
CERTIFICATE OF CORRECTION

PATENT NO. : 6,720,913 B1 Page 1 of 1
DATED : April 13, 2004
INVENTOR(S) : Brian W. Schipper It is certified that error appears in the above-identified patent and that said Letters Patent is hereby corrected as shown below:

Title page,
Item [57], ABSTRACT,
Line 2, please add -- by epoch -- after the word "epoch".

Column 1,
Line 8, please replace "s lip" with -- slip --.
Line 13, please replace "infonrmation" with -- information --.
Line 67, please replace "ore" with -- more --.

Column 4,
Line 65, please replace "nd" with -- and --.

Signed and Sealed this

Ninth Day of November, 2004

JON W. DUDAS
*Director of the United States Patent and Trademark Office*